PULSE CIRCUIT GENERATING NOISE DISCRIMINATED TIME-REFERENCE PULSES FROM ANALOG INPUT

Filed April 6, 1964

INVENTOR.
JOHANNES SCHOUTE

BY [signature]

ATTORNEY

United States Patent Office 3,280,346

Patented Oct. 18, 1966

3,280,346

PULSE CIRCUIT GENERATING NOISE DISCRIMINATED TIME-REFERENCE PULSES FROM ANALOG INPUT

Johannes Schoute, Mijdrecht, Netherlands, assignor to International Business Machines Corporation, New York, N.Y., a corporation of New York Filed Apr. 6, 1964, Ser. No. 357,442
Claims priority, application Netherlands, May 3, 1963, 292,336
5 Claims. (Cl. 307—88.5)

Figure 1:
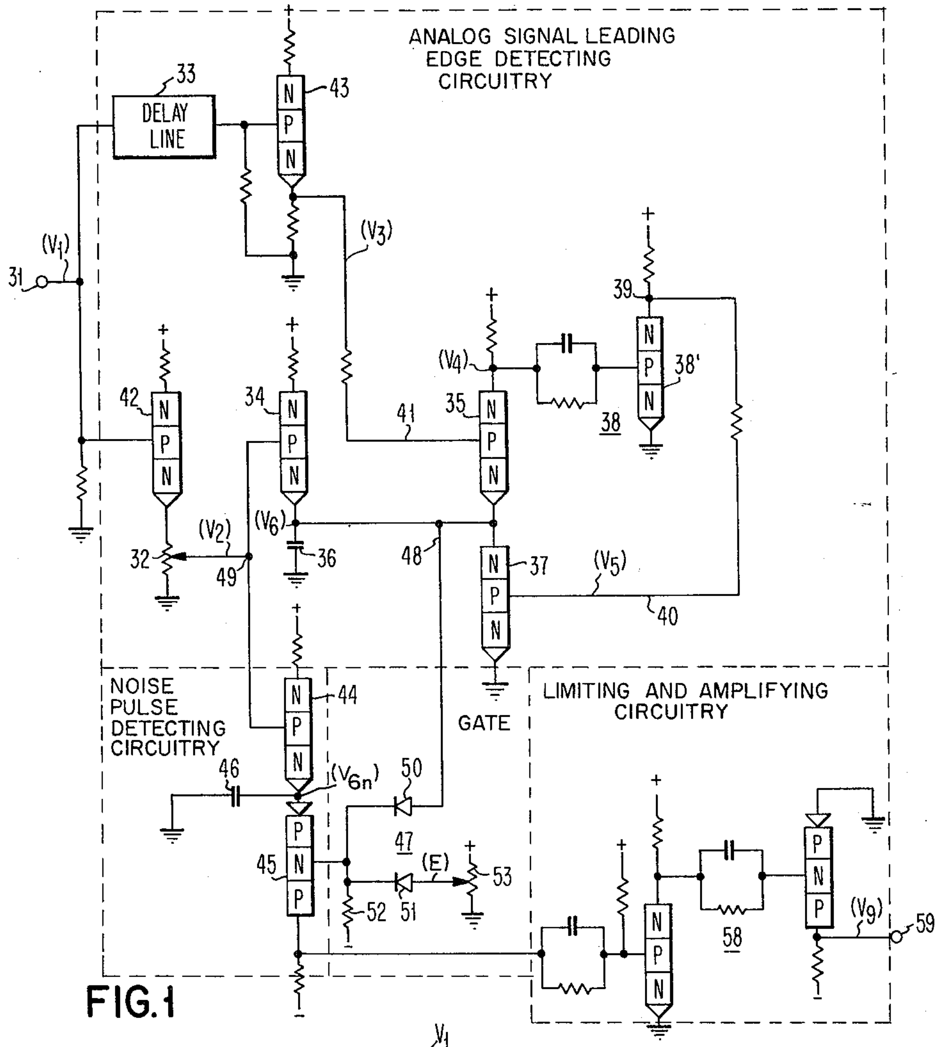

The invention relates to electronic circuits for supplying a time reference pulse in response to an applied analog pulse and for discriminating against noise accompanying that analog pulse.

The term reference pulse is construed hereinafter as a pulse with steep leading edge, which consequently provides a sharply defined time indication. The term analog pulse is construed hereinafter as a pulse with relatively widely spaced edges. Generally such pulses have a rather flat top and among each other show peak level variations. Such pulses often have extra diverging edges at the base. Examples of this are a half period of a sine wave, or a half period of a squared sine wave. In technology such analog pulses are present, far example, in scanning or transmission processes.

If in optical character recognition a sharp black-white transition is to be scanned, the scan signal obtained still has a finite rise time, in consequence of the diameter of the scanning light spot or the width of the scan slot. Moreover, the black-white transition itself, for example, the side edge of a type character, may not be clear and sharply defined in consequence of imperfections of paper and impression. These limitations and imperfections will partly result in a widening of the pulse. Minor noise waves or spikes may result because of small blots, ink specks or white spots within the impression. Also, upon scanning a magnetic mark on a record carrier an analog pulse develops, on account of the finite width of the scan slot, and the continuity of the magnetic leakage field. Also, here there is noise present in consequence of magnetic imperfections of the registration, for example, unequal distribution of the magnetic material in the oxide layer or in the printing ink.

Upon transmission of a signal pulse of definite shape a widened pulse will be received in consequence of distortion in the transmission medium. Also, here interferring noise will be superimposed on the signal received.

Owing to the circumstances described before, it is a problem to extract the information contained in the appearance of the analog pulse. As a result of the widely spaced pulse edges and the flat top, the exact time of the analog pulse is difficult to determine. Detection on the top is inaccurate and is relatively strongly interferred with by noise spikes. It is true that cutting off the pulse below a threshold value and detecting the time when this threshold is exceeded will eliminate the widened base, but there will be difficulties if the analog pulses show great peak value variations. For, weak signal pulses are almost entirely cut off so that detection takes place near the top; very strong signal pulses are almost entirely passed, so that detection is effected on a relatively low part of the edge, far from the top. The pulse detection times thus obtained are not equivalent.

This problem is encountered in practice, for example, when in automatic character recognition, characters printed on a document are encountered, which characters have been applied at different times by means of different printing processes, some possibly with considerably more contrast than others. Furthermore, within a single printed character it is the character shape itself that is a cause of the occurrence of scan pulses of different amplitude or peak value.

To solve this problem, detection circuits for generating reference pulses in response to analog pulses are described in a copending U.S. patent application Serial No. 357,441, of Hein van Steenis, filed concurrently with this application. According to this application the signal input is connected, by way of seperate signal paths with the base electrodes of two transistors, the emitters of which are connected with the same unilaterally grounded capacitor, and that one of said signal paths comprises an attenuator to attenuate the signal to a predetermined fraction, in consequence of which the transistor controlled by the attenuated signal charges the capacitor to the predetermined fraction of the peak voltage of the pulse during the leading edge of an analog pulse, whereupon this transistor stops passing current, and that subsequently the second transistor, which is controlled by the unattenuated signal via the second signal path, becomes presently conductive for generating an output reference pulse with steep leading edge, when the edge of the analog pulse has passed the predetermined fraction of the peak voltage.

Detection of an edge of the analog pulse when this edge passes a predetermined fraction or percentage of the peak value provides a much more sharply defined criterion than peak detection and detection times that compare better than with the previously mentioned detection upon exceeding a fixed threshold value. The peak level fraction at which detection takes place is continuously adjustable in a broad region, for example, from 10 to 90 percent. This value can be most favorably selected from the steepest gradient of the pulse edge. The influence of noise spikes superimposed on the pulse shape is then at a minimum.

The circuit of FIG. 3 of the previously mentioned U.S. patent application 357,441 advantageously provides a steeply rising, strong output pulse, in consequence of the positive feedback, but in case of input noise this circuit will be unstable in the form shown in that application. This drawback cannot be obviated by applying threshold voltage, as described, if the peak voltage of an input pulse was higher than the threshold voltage, the predetermined fraction of the peak voltage being lower than the threshold voltage. From this it will be clear that the operation of the circuit would be seriously disturbed.

According to the invention, this drawback is overcome by compound circuitry of the type described in the copending application wherein the reference pulse is first established in one such circuit and then applied to another such circuit arranged to discriminate against noise.

Figure 2:
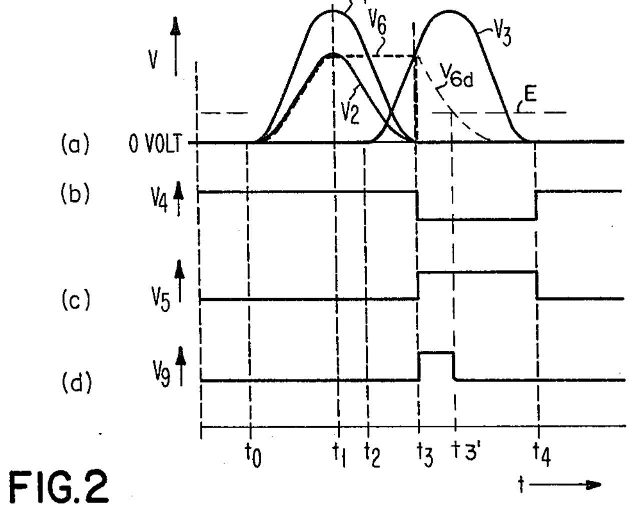

Other objects, characteristics and advantages of the invention will appear from the following specification, with reference to the drawing in which:

FIG. 1 shows an embodiment for detection on the leading edge of an analog pulse, and FIG. 2 shows the wave shape of the voltage at different points of FIG. 1.

FIG. 1 shows the principle of an embodiment of the invention. This circuit detects positive analog pulses on the leading edge, when a predetermined percentage of the peak value is reached. The circuit does not respond to negative input pulses. A corresponding circuit for the detection of negative pulses would be obtained by reversing the polarities of all the circuit elements.

The input terminal 31 is connected to the base of an NPN transistor 34 by way of a potentiometer 32. The input terminal 31 is connected over a second path with the base of an NPN transistor 35 by way of a delay line 33. The emitters of the transistors 34 and 35 are connected with the same plate of a capacitor 36, the other plate of which is grounded. The capacitor is furthermore connected with the collector of a transistor 37, the emitter of which is grounded. The collector of the transistor 35 is connected with the collector terminal 39 of an inverter 38. The collector terminal 39 is connected by a line 40 with the base of the transistor 37.

In the rest or idling state, the capacitor 36 is not charged and the transistors 34 and 35 do not conduct. Consequently, the input level of the inverter 38 is positive. It is assumed that the output of the inverter circuit 38 has a rest level of zero volts. Then the transistor 37 is not conductive. However, as soon as the transistor 35 goes into conduction, the negative going pulse of the collector is inverted by the inverter transistor 38', to cause a positive pulse, putting the transistor 37 into conduction.

When a positive going analog pulse appears at the input terminal 31, the leading edge of the fractionally attenuated pulse from the potentiometer 32 renders the transistor 34 conductive, so that the capacitor 36 is charged. The capacitor voltage follows the voltage of the leading edge of the attenuated pulse. The transistor 35 remains at zero control voltage, so long as the leading edge of the pulse has not reached the output of the delay line 33.

When the pulse peak appears at the input terminal 31, the transistor 34 is cut off, the control voltage at the base no longer rising about the emitter voltage. The capacitor voltage is now equal to the predetermined fraction of the peak voltage of the pulse, as adjusted by means of the potentiometer 32. So long as the transistors 34, 35 and 37 do not conduct further, the voltage of the capacitor 36 remains constant. If the delay time of the delay line 33 is longer than half the pulse widths, it is only now that the leading edge of the delayed pulse begins to appear on the output of the delay line. Initially the transistor 35 remains non-conductive, so long as the leading edge of the delayed pulse has not yet reached the predetermined fraction of the peak voltage. However, as soon as the base voltage of the transistor 35 has risen above the capacitor voltage, the transistor 35 suddenly turns conductive, so that again current flows to the capacitor 36 and the voltage of the capacitor 36 tends to follow the leading edge of the pulse further upwards. However, at practically the same moment the transistor 37 is put into conduction, in consequence of which the capacitor 36 is quickly discharged, its voltage decreasing sharply. This results again in the emitter voltage of the transistor 35 decreasing along with the capacitor voltage, the control voltage at the base of the transistor 35 increasing further along with the rising leading edge of the delayed pulse. Owing to this positive feedback through the inverter 38, the line 40 and the transistor 37, the voltage drop at the collector of the transistor 35 is very sharp, substantially rectangular.

The steeply rising output pulse on the collector terminal 39 is an accurate time reference for the moment the leading edge of the delayed pulse has reached the predetermined fraction of the peak value. The conduction of transistors 35 and 37 is interrupted when the delayed pulse has emerged completely from the delay line 33 and its trailing edge approaches the rest level again. Now capacitor 36 is entirely discharged, all the transistors 34, 35 and 37 are cut off. It will be clear that the delay time of the line 33 should be at least equal to half the pulse width to render it possible to adjust the detection level at any desired fraction of the peak value. A smaller delay time limits the adjustment region. A condition for good operation is that the transistor 34 be cut off before the transistor 35 becomes conductive, in other words the delayed pulse should not reach the previously set fraction of the peak value until the undelayed pulse has reached its peak value.

Between the signal input terminal 31 and the attenuator 32 a transistor 42 has been inserted, operating as an emitter follower, with potentiometer resistance 32 as emitter load. Between the delay line 33 and the second transistor 35 an emitter follower 43 has been included. As well known, an emitter follower supplies, through its emitter load, an output voltage which is a true picture of its input voltage. Normally the transistor in inverter circuit 38 conducts so long as transistor 35 does not conduct. Point 39 then is at little more than zero volts, so that a very small current through the resistance in feedback line 40 is insufficient to cause the transistor 37 to conduct. This continues when the capacitor 36 is charged, through the first transistor 34, to a fraction of the peak voltage by the attenuated, but not delayed leading edge of a positive analog pulse from the potentiometer 32. However, when the unattenuated leading edge of the delayed pulse from the delay line 33 puts the second transistor 35 into conduction by way of the emitter follower 43 and the lead 41, the negative going pulse of the collector of the transistor 35 interrupts the conduction of the transistor 38', so that the voltage at the terminal 39 rises. As described in the foregoing, this operation is amplified and expedited, because the positive pulse on the collector point 39 operates the discharge switch transistor 37 over the line 40, so that the capacitor 36 is presently discharged. However, the positive pulse at the collector point 39 is not an output pulse, because in the operation of the circuit so far described no discrimination in respect of positive noise spikes has been obtained yet.

Discrimination in respect of noise spikes is obtained in the lower half of FIG. 1. A second, unilaterally grounded capacitor 46 is connected with the emitters of NPN transistor 44 and PNP transistor 45. The transistor 44 is controlled by the same attenuated signal controlling the transistor 34, fed over a line 49 of the attenuator 32 to the base of the transistor 44. As the transistor 44 is of the same type as the transistor 34, namely an NPN type, the second capacitor 46 is charged simultaneously with the first capacitor 36 to the same fraction of the peak voltage of a positive pulse. When the peak of the attenuated, not delayed pulse voltage is reached, the transistor 44 is cut off, along with the transistor 34.

As an alternative the same operation of the transistor 44 will be obtained if the line 49, controlling the base, is connected with the capacitor 36 instead of with the attenuator 32. For, when the transistor 34 conducts, the voltage on the capacitor 36 follows the control voltage from the potentiometer 32 immediately, so that to the active control signal to the transistor 44 it does not matter which of the starting points mentioned are selected for the line 49.

The plate of the capacitor 36, to which the emitters of the two transistors 34 and 35 are connected, is furthermore connected with the base of the fourth transistor 45 over a line 48 and a diode 50. Diode 50 forms part of a diode gate 47, which further comprises a diode 51 and a resistor 52. The diode 51 receives a threshold voltage E from a potentiometer 53.

Only if the predetermined fraction of the peak voltage, which is retained on the first capacitor 36, is higher than the threshold voltage E, does the diode 50 conduct. The sudden decrease of the voltage stored in the first capacitor 36, when the transistor 37 switches, will in this case be transmitted to the base of the transistor 45 over line 48 and conducting diode 50. This transistor becomes suddenly conductive, because the emitter voltage, that is, the voltage of the second capacitor 46, is still equal to the starting level of the voltage drop on the first capacitor 36. The positive going, steep pulse edge at the collector of the fourth transistor 45 is fed to a limiting amplifier 58, consisting, for example, only of two transistor stages. Conduction through the transistor 45 is broken when the control voltage has reached the threshold level E and the capacitor 46 has also been discharged along the curve V*6d* in FIG. 2 to the level E. Consequently, there appears at an output terminal 59 a narrow, rectangular, positive going pulse, starting from the negative feed level as rest level, with zero volt as the top level.

The time information in the steep leading edge of this output pulse is a reference or indication for the occurrence of the positive analog input pulse, more precisely for the moment at which the leading edge of this pulse has reached a predetermined percentage of the peak value, increased by the delay time of the delay line 33, which has a constant predetermined value.

However, if the voltage stored in the capacitor 36 is below the threshold value E, the diode 50 is blocked and the diode 51 conducts. Insofar as upon the voltage drop of the capacitor 36 a transient pulse would yet be transmitted through the capacity of the blocked diode 50, it goes to ground through the conducting diode 51 and resistor 53. The transistor 45 does not become conductive herewith.

In FIG. 2 the wave shapes of the voltage at a number of points of FIG. 1 have been represented. It is assumed that the attenuator 32 has been adjusted to supply the fraction ⅔ or 67 percent of the input signal. At curve (*a*) are represented a positive analog input pulse $V_1$, the attenuated pulse $V_2$ from the potentiometer 32, the delayed unattenuated pulse $V_3$ from 33 and the voltage $V_6$ on the first capacitor 36.

At time $t_0 V_1$ begins to rise, as does $V_2$. $V_6$ follows $V_2$, because the first transistor 34 conducts. At time $t_1$ the pulse peak has been reached, $V_6$ is now constant and equal to 67 percent of the peak value. At time $t_2$ the delayed pulse $V_3$ starts, $t_2-t_0$ being equal to the delay time of the delay line 33. At time $t_3 V_3$ passes the constant level of $V_6$, so that the second transistor 35 and the switch transistor 37 turn suddenly conductive. $V_6$ steeply decreases to zero volts.

The collector voltage $V_4$ of the transistor 35, the control voltage $V_5$ of the switch transistor 37 and the output pulse $V_9$ on the output terminal 59 are shown at (*b*), (*c*) and (*d*), respectively. The steep leading edge of $V_9$ corresponds to the substantially right angle in $V_6$ at time $t_3$. However, pulse $V_9$ will not appear if the fourth transistor 45 has not become conductive, because the horizontal level of $V_3$ was not higher than the positive threshold voltage.

In various circumstances a detection switch according to the invention will offer considerable advantages. When, for example, the width and the shape of the analog pulses do not vary, the time of appearance of the analog pulse is accurately detected on the leading edge. The detection accuracy is not distributed by great peak value variations.

When both peak value and pulse width vary, the detection of say a 50 percent level of a pulse edge will provide a reliable indication of the occurrence of the pulse. When two detection circuits are used, it is moreover possible to obtain information about the pulse shape, for example, the rise time is determined by detection of the 25 percent and 75 percent levels on the leading edge, or the pulse width by detection of the 50 percent levels on leading and trailing edges. Another possibility is first to differentiate the analog pulse, as a result of which a positive pulse is obtained followed by a negative one. These pulses are then detected, both in the example at 50 percent of their trailing edge.

Applications of the invention are envisaged, for example, in the detection of scan signals in magnetic or optical character recognition, demodulation of a binary information modulated carrier wave in accordance with the principle of frequency modulation or phase modulation, and electrical measuring technology.

The invention claimed is:

1. A circuit arrangement for producing a time reference pulse in response to an input pulse varying in amplitude and shape comprising.

a pair of capacitors, each having two electrodes,
means connecting one of said electrodes of each of said capacitors to a point of fixed reference potential,
two pairs of transistors, each transistor having emitter, base and collector electrodes,
means connecting the emitter electrodes of both of said transistors of each pair to the other electrode of one of said capacitors,
means applying direct energizing potential to the collector electrodes of said transistors,
an attenuator having input and output terminals,
means for applying an input pulse signal to the input terminal of said attenuator for deriving a predetermined fraction of said input pulse signal at the output terminal of said attenuator,
means connecting the output terminal of said attenuator to the base electrode of one of said transistors of each pair for charging the corresponding capacitor on the leading edge of said input pulse to a value substantially equal to said predetermined fraction of the peak voltage of said input pulse signal at which value said one transistor of each pair ceases conducting,
means for delaying said input pulse signal,
signal to the other transistor of one of said pairs of transistors at which said other transistor begins to conduct at the value of said input signal equaling the charge on the one capacitor corresponding to said one pair of transistors,
an OR gate having two input terminals and an output terminal,
means connecting one input terminal of said OR gate to the other electrode of said one capacitor,
means applying thresholding potential to the other input terminal of said OR gate,
means connecting the output terminal of said OR gate to the base electrode of the other transistor of the other pair of transistors, and
means for deriving a pulse at the collector electrode of said other transistor indicative of the timing of said input pulse.

2. A circuit arrangement for producing a time reference pulse in response to an input pulse varying in amplitude and shape comprising, signal input terminals,
one pair of transistors of the same conductivity type, each having emitter, base and collector electrodes,
one capacitor having one electrode connected to the emitter electrodes of both said transistors, and having the other electrode connected to a point of fixed reference potential,
another pair of transistors of opposite conductivity type, each having emitter, base and collector terminals,
another capacitor having one electrode connected to both emitter terminals of said other pair of transistors and having the other electrode connected to said point of fixed reference potential,
an attenuator having input and output terminals,
means coupling said input terminal to said signal input terminals for deriving a predetermined fraction of the input pulse signal at the output terminal of said attenuator,
means connecting the output terminal of said attenuator to the base electrode of one of the transistors of said one pair and to the base terminal of the one of said transistors of said other pair which is of the same conductivity type as the transistors of said one pair,
signal delay means,
means coupling said signal delay means to said signal input terminals and to the base electrode of the other transistor of said one pair,
an OR gate having two input terminals and an output terminal connected to the base terminal of the other transistor of said other pair, means applying thresholding potential to one input of said OR gate, means coupling the emitter electrodes of said one pair of transistors to the other input of said OR gate, and means for deriving a pulse at the colector terminal of said other transistor of said other pair.

3. A circuit arrangement as defined in claim 2 and wherein said coupling means comprise emitter followers.

4. A circuit arrangement as defined in claim 2 and wherein a discharge switch is connected across the electrodes of said one capacitor, and means are connected between said discharge switch and the collector electrode of said other transistor of said one pair of transistors for discharging said capacitor.

5. A circuit arrangement as defined in claim 4 and wherein said means connected between said switch and said other transistor comprise pulse inverter means.

References Cited by the Examiner

UNITED STATES PATENTS

| | | | |
|---|---|---|---|
| 2,540,512 | 2/1951 | Crosby | 329—107 |
| 3,018,386 | 1/1962 | Chase | 307—88.5 |
| 3,188,574 | 6/1965 | Parmer | 307—88.5 |

References Cited by the Applicant

UNITED STATES PATENTS

| | | |
|---|---|---|
| 2,924,812 | 2/1960 | Merritt. |
| 3,004,174 | 10/1961 | Seidman. |
| 3,064,243 | 11/1962 | Thompson. |
| 3,102,237 | 8/1963 | Elliott. |

J. HEYMAN, *Assistant Examiner.*

ARTHUR GAUSS, *Primary Examiner.*